United States Patent [19]
Campbell

[11] 4,054,302
[45] Oct. 18, 1977

[54] TRAILER HITCH GUIDE MEANS

[76] Inventor: Jack R. Campbell, 505 W. Sycamore, Mason, Mich. 48854

[21] Appl. No.: 672,413

[22] Filed: Mar. 31, 1976

[51] Int. Cl.² ............................................. B60Q 1/26
[52] U.S. Cl. .................................... 280/477; 33/264; 116/28 R
[58] Field of Search ......................... 280/477; 33/264; 116/28 R, DIG. 26; 240/8.1 A, 2.25, 7.1 R; 340/52 R, 282

[56]  References Cited
U.S. PATENT DOCUMENTS

| | | | |
|---|---|---|---|
| 1,784,466 | 12/1930 | Rensonnet | 240/8.1 A |
| 2,358,867 | 9/1944 | Madan | 240/2.25 X |
| 2,473,981 | 6/1949 | Wood | 240/8.1 A |
| 2,791,678 | 5/1957 | Ferman | 240/8.1 A |
| 3,702,029 | 11/1972 | Anderson | 33/264 |
| 3,765,703 | 10/1973 | Voelkerding | 280/477 |
| 3,901,536 | 8/1975 | Black | 280/477 |

OTHER PUBLICATIONS

*Popular Science*, Trailer-Hitching Guide, July, 1970, p. 95.

*Primary Examiner*—Joseph F. Peters, Jr.
*Assistant Examiner*—John A. Pekar
*Attorney, Agent, or Firm*—Malcolm R. McKinnon

[57]  ABSTRACT

A trailer hitch guide intended for use in assisting the driver of an automotive vehicle to align, for hitching purposes, a trailer hitch ball, of the type conventionally carried by an automobile or other automotive hauling vehicle, with a trailer hitch socket, of the type conventionally carried on the tongue of a trailer, the guide being comprised of a pair of identical, highly visible and electrically lightable guide members, one of the guide members being adapted to be temporarily attached to the trailer tongue while the other guide member is adapted to be temporarily attached to the rear of the hauling vehicle whereby both guide members are highly visible through the rear window of the vehicle, during dim lighting conditions and at night as well as during daylight hours, to a vehicle driver seated in the driver's seat during the aligning operation.

1 Claim, 3 Drawing Figures

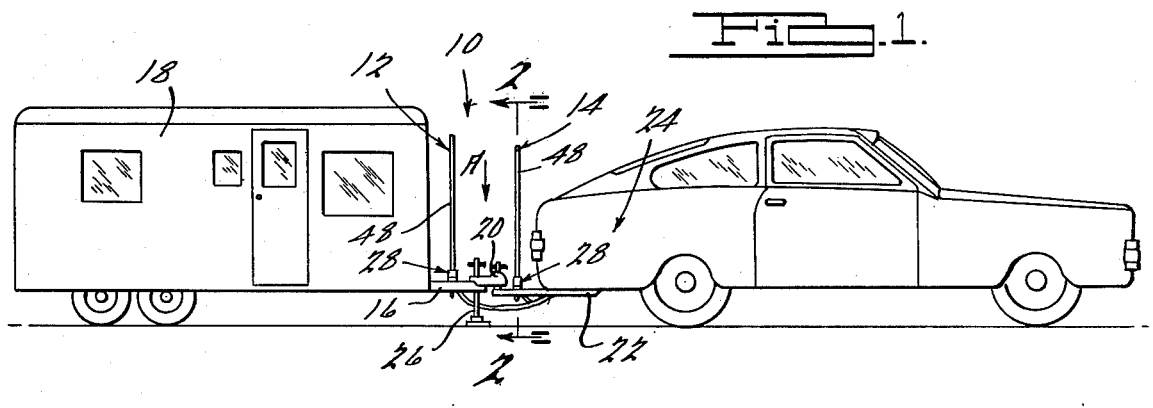
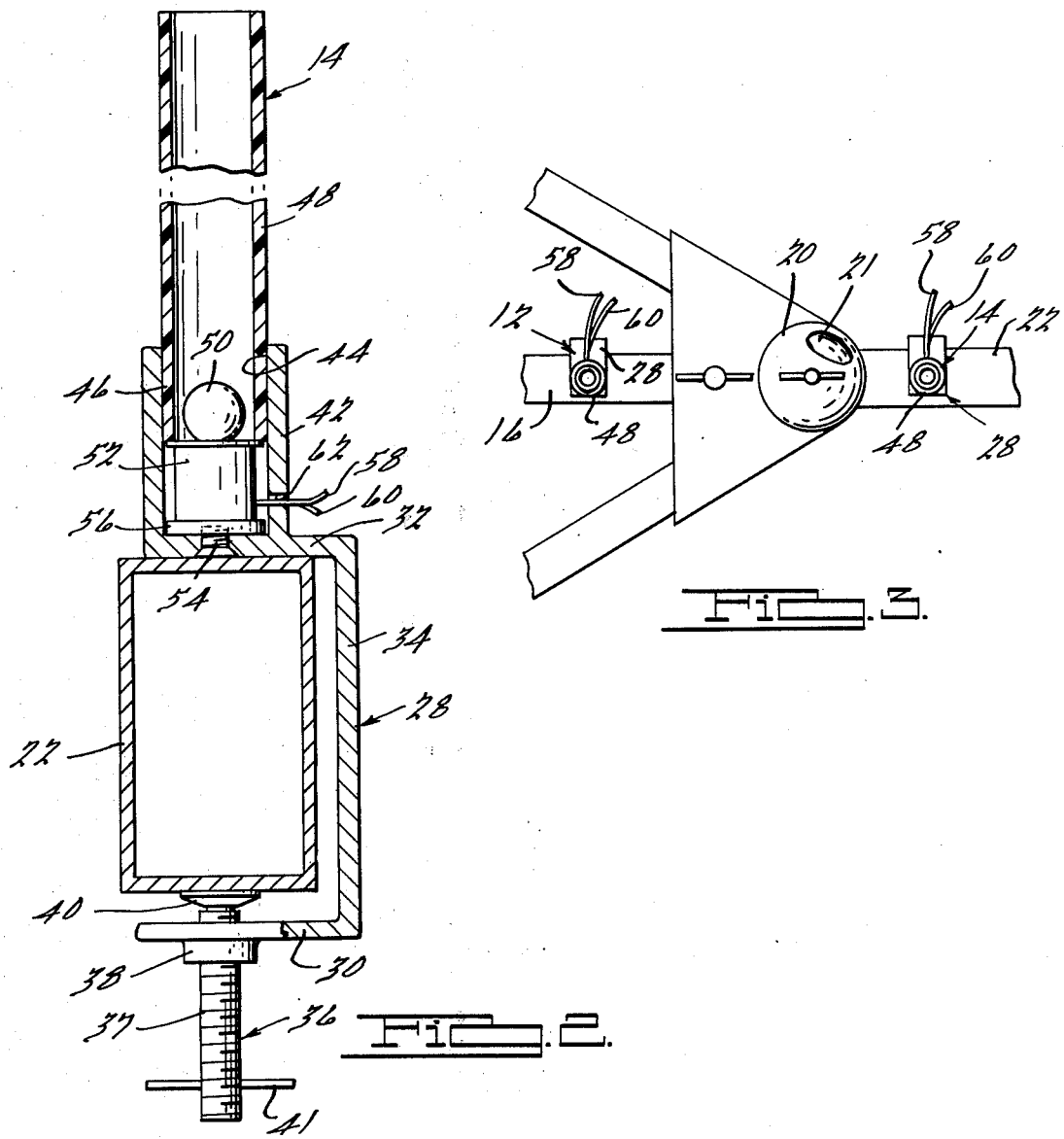

TRAILER HITCH GUIDE MEANS

BRIEF SUMMARY OF THE INVENTION

This invention relates to guide means and, more particularly, to an improved trailer hitch guide means particularly adapted for use in assisting the driver of an automobile or other automotive hauling vehicle to align, for hitching purposes, a trailer hitch ball, of the type conventionally carried by the hauling vehicle, with a trailer hitch socket, of the type conventionally carried on the tongue of a trailer. This invention is particularly intended for use in connection with relatively large and/or heavy trailers, such as relatively large travel trailers, cargo trailers and/or other large and heavy trailers, which cannot be easily moved manually for purposes of aligning and subsequently hitching the aforementioned ball and socket of the hitch together.

As is well known in the art, a trailer hitch ball is conventionally fixed to and projects rearwardly from the central rear end portion of an automobile or other automotive hauling vehicle, such as a pick-up truck, and is disposed in a position such that the ball is not normally visible to a driver seated in the driver's seat of the vehicle. The trailer hitch socket, conventionally carried on the tongue of the trailer, also is not normally within the view of such a seated driver during the final increments of movement of the vehicle as it is being backed toward the trailer for hitching purposes. Consequently, the process of aligning and hitching an automobile, for example, to a relatively heavy trailer through the agency of a ball and socket connection has presented considerable difficulties to persons who are relatively unskilled and/or inexperienced in effecting a trailer aligning and hitching operation. Such difficulties are increased when the vehicle backing and aligning operation must be performed by the driver alone and without assistance from a person in a position to view the ball and socket members and instruct the driver during the ball and socket aligning operation, and even greater difficulties are presented when the trailer is relatively large and heavy and cannot be easily moved manually even a few inches for purposes of effecting precise alignment of the ball and socket. Moreover, the difficulties are compounded when the aligning operation must be carried out under relatively dim or dark conditions, as for example, at dawn, at twilight or during night time hours. Heretofore, various guiding devices, such as the guiding devices disclosed in U.S. Pat. Nos. 2,736,885; 2,815,732; 3,363,318; 3,765,703; 3,818,599; 3,866,328 and 3,867,898 have been proposed or utilized for assisting a vehicle driver in effecting the desired alignment of the hitch ball and socket. However, such prior devices have been subject to a number of deficiencies. For example, many prior guiding devices of the indicated character are relatively complicated and expensive. Many other prior devices are not visible or useful to a vehicle driver during dim or dark lighting conditions, and often these prior guiding devices are difficult to install on the trailer and/or automotive vehicle. Moreover, the users of some prior devices often do not possess the mechanical ability or intellect required to install the devices with the result that the users are obligated to employ trained personnel for the purpose of installing the devices with a consequent increase in the cost of using the product.

An object of the present invention is to overcome the aforementioned as well as other disadvantages in prior trailer hitch guide means of the indicated character and to provide an improved trailer hitch guide means incorporating improved means for assisting the driver of an automotive vehicle to align a trailer hitch ball with a trailer hitch socket for hitching purposes.

Another object of the invention is to provide an improved trailer hitch guide means which is highly visible through the rear window of a hauling vehicle during dim lighting conditions and at night as well as during daylight hours to a vehicle driver seated in the driver's seat during a ball and socket aligning operation.

Another object of the invention is to provide an improved trailer hitch guide means which may be easily and quickly mounted on and/or removed from an automotive hauling vehicle and the tongue of a trailer by the users thereof without requiring special training or tools.

Another object of the invention is to provide an improved trailer hitch guide means that is electrically lightable.

Another object of the invention is to provide an improved trailer hitch guide means that is economical to manufacture and assemble, durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a side elevational view of a trailer hitch guide means embodying the present invention, showing the same mounted on a conventional draw bar projecting from the central rear end portion of an automobile, and mounted on the tongue of a trailer;

FIG. 2 is an enlarged cross-sectional view, with portions broken away, of a portion of the structure illustrated in FIG. 1, taken on the line 2—2 thereof; and FIG. 3 is a top plan view, with portions broken away, of a portion of the structure illustrated in FIG. 1, looking in the direction of the arrow "A".

DETAILED DESCRIPTION

Referring to the drawings, and more particularly to FIG. 1 thereof, a trailer hitch guide means, generally designated 10, embodying the present invention is illustrated therein, the trailer hitch guide means 10 being comprised of a pair of guide members, generally designated 12 and 14, which are preferably identical in construction and which will be described hereinafter in greater detail. In FIG. 1, the guide member 12 is shown attached to the tongue 16 of a conventional trailer 18, the guide member 12 being attached to the tongue 16 at a position in longitudinal alignment with, but spaced rearwardly from, a conventional socket member 20 fixed to the forward end portion of the tongue 16 in any desired or conventional manner. The socket member 20 is adapted to receive and effect a limited universal connection with a ball 21 in a manner well known in the art and which need not be described herein in greater detail, it being understood that the ball 21 is secured to the free end portion of a draw bar 22 fixed to and projecting rearwardly from the central rear end portion of a hauling vehicle, such as the automobile 24 illustrated in FIG. 1. As is also well known in the art, before the ball 21 can be hitched to the socket member 20, the ball 21 must initially be precisely aligned in vertical, longitudinal and lateral relationship with respect to the socket member 20, and the trailer hitch guide means 10, comprised of the guide members 12 and 14, is adapted to assist a vehicle driver seated in the driver's seat of a hauling vehicle, such as the automobile 24, to back the vehicle toward the trailer 18 to a position such that the ball 21 is disposed directly below and in precise alignment with the socket member 20. The hitching operation may then be completed by lowering the socket member 20 onto the ball 21 through the agency of a jack 26 and then locking the socket member 20 onto the ball 21 in a manner well known in the art.

As previously mentioned, the guide members 12 and 14 are preferably identical in construction, each of the guide members being comprised of a generally C-shaped base 28 which is preferably formed of aluminum, steel or other suitable material having sufficient strength to withstand the forces exerted thereon. The base 28 includes a pair of flange portions 30 and 32 integrally joined by a web portion 34, the distance between the flange portions 30 and 32 being sufficient to accommodate, with clearance, the tongue 16 of the trailer or the draw bar 22 therebetween. A clamping member 36 is provided having an externally threaded shank portion 37 which projects through and threadably engages an internally threaded boss 38 formed integrally with the flange 30. A bearing member 40 is provided which is secured to the upper end portion (as viewed in FIG. 2) of the clamping member 36, the bearing member 40 being adapted to bear tightly against the lower surface of the trailer tongue 16 or the draw bar 20, as the case may be, when the clamping member 36 is manually tightened by turning the shank portion 37 through the agency of a cross bar 41 extending transversely through the shank portion 37. With such a construction, the base 28 may be easily and quickly attached to and removed from the trailer tongue or the draw bar without the use of special tools, and the users thereof are not required to possess exceptional mechanical ability or intellect.

Extending upwardly from the flange portion 32 of the base 28 is a tubular retainer 42 which is preferably formed integrally with the flange portion 32 and which defines a cylindrical passageway 44 adapted to receive, with a sliding fit, the lower end portion 46 of an elongate, fluorescent, cylindrical guide tube 48 which may be formed of any desired or conventional rigid plastic material, such as a translucent acrylic resin. The guide tube 48 is impregnated and/or coated with a fluorescent or luminous paint so as to render the guide tube highly visible. The guide tube 48 is perferably approximately three-fourths inch in outside diameter, five-eighths inch in inside diameter, and may be approximately two to four feet in length depending upon the size of the hauling vehicle. For example, an automobile of a size conventionally known as "compact", may permit the utilization of a shorter tube than would be required for a full size pick-up truck with a relatively high tail gate.

An electric lamp 50 and associated socket 52 are provided which are mounted in the lower end portion of the passageway 44 defined by the retainer 42, the socket 52 being retained by a screw 54 which passes through the flange portion 32 of the base 28 and threadably engages the base 56 of the socket. The lamp 50 and associated socket 52 are electrically connectable by electric wires 58 and 60 which project through an opening 62 provided in the retainer portion 42, the wires being of any suitable length which will permit connection to the battery (not shown) of the automobile or any other suitable source of electrical energy whereby light emanating from the lamp 50 will render the guide tube 48 highly visible at night or during dim lighting conditions, such as at dusk or dawn. It will be appreciated that many trailer owners install or have installed an electric socket outlet connection on the rear end portion of their hauling vehicle, such socket outlet connection being electrically connected to the vehicle battery and providing a convenient electrical power connection for the trailer stop lights and running lights. Such a vehicle socket outlet connection can be utilized conveniently to provide a temporary source of electrical power for the lamp 50 and associated wires 58 and 60 which may be fitted with a suitable plug adapted to be received in the vehicle socket outlet and thereby electrically connect the lamp to the vehicle battery.

In the operation of the trailer hitch guide means 10, when the user desires to align and hitch the hauling vehicle 24 to the trailer 18, the user temporarily clamps the guide member 12 to the tongue 16 of the trailer 18 and temporarily clamps the guide member 14 to the draw bar 22 of the vehicle 24 in the manner previously described whereby each guide tube 48 is highly visible through the rear window of the vehicle to the vehicle driver seated in the driver's seat. Under dim or dark lighting conditions, the lamp 50 in each guide member may be electrically energized by connecting the wires 58 and 60 to the vehicle battery in the manner previously described so that each guide tube 48 is rendered highly visible under such dim or dark lighting conditions. The vehicle driver can then maintain the trailer hitch ball 21 in alignment with the trailer hitch socket member 20 while backing the vehicle toward the trailer by maintaining the highly visible guide tubes 48 of the guide members 12 and 14 in alignment as the vehicle is backed toward the trailer to a position such that the ball 21 is directly beneath and in precise alignment with the trailer hitch socket member 20. The hitching operation may then be completely by lowering the socket member 20 onto the ball 21 through the agency of the jack 26, and then locking the socket member 20 onto the ball 21 in the conventional manner. After the hitching operation has been completed, the guide members 12 and 14 may be easily and quickly removed from the trailer tongue 16 and draw bar 22, respectively, by merely unscrewing the clamping member 36 through the agency of the cross bar 41, thereby facilitating easy storage of the trailer hitch guide means 10 when the trailer hitch guide means is not in use.

While a preferred embodiment of the invention has been illustrated and described, it will be understood that various changes and modifications may be made without departing from the spirit of the invention.

What is claimed is:

1. A trailer hitch guide means for use in assisting the driver of an automotive hauling vehicle to align a trailer hitch ball, carried by the hauling vehicle, with a trailer hitch socket, carried by a trailer, said guide means comprising, in combination, a pair of guide members, each of said guide members including a base of generally C-shaped configuration and having spaced first and second flange portions integrally joined by a web portion, clamping means threadably engaging said first flange portion and operable to clamp one of said guide members to a hauling vehicle in longitudinal alignment with said hitch ball and to clamp the other of said guide members to a trailer in longitudinal alignment with said hitch socket, means for manually actuating said clamping means, an elongated guide tube projecting from said base, said guide tube incorporating fluorescent means emitting visible light upon absorption of radiation from an external source, tubular retainer means carried by said second flange portion of said base and defining a recess adapted to receive one end portion of said guide tube whereby said guide tube is supported by said retainer means, and electric lamp means disposed in the recess defined by said retainer means, said electric lamp means projecting into said guide tube and being energizable to render said guide tube highly visible.

* * * * *